(12) United States Patent
Lake et al.

(10) Patent No.: US 12,287,056 B1
(45) Date of Patent: Apr. 29, 2025

(54) DUAL CONTAINMENT PIPE ASSEMBLY

(71) Applicant: Watts Regulator Co., North Andover, MA (US)

(72) Inventors: Paul Lake, Waltham, MA (US); Carl Bjoerk, Fayetteville, NC (US); Austin Lewis, Bonham, TX (US)

(73) Assignee: Watts Regulator Co., North Andover, MA (US)

( * ) Notice: Subject to any disclaimer, the term of this patent is extended or adjusted under 35 U.S.C. 154(b) by 0 days.

(21) Appl. No.: 18/408,948

(22) Filed: Jan. 10, 2024

(51) Int. Cl.
| | | |
|---|---|---|
| *F16L 9/18* | (2006.01) | |
| *F16L 39/00* | (2006.01) | |
| *F16L 43/00* | (2006.01) | |

(52) U.S. Cl.
CPC ............. *F16L 9/18* (2013.01); *F16L 39/005* (2013.01); *F16L 43/00* (2013.01)

(58) Field of Classification Search
CPC ............ F16L 9/18; F16L 43/00; F16L 39/005
See application file for complete search history.

(56) References Cited

U.S. PATENT DOCUMENTS

| | | | |
|---|---|---|---|
| 4,781,402 A * | 11/1988 | Ream | F16L 39/005 285/47 |
| 5,018,260 A | 5/1991 | Ziu | |
| 5,141,261 A | 8/1992 | Ziu | |
| 5,197,518 A | 3/1993 | Ziu | |
| 5,398,973 A | 3/1995 | McAtamney | |
| 5,400,828 A | 3/1995 | Ziu et al. | |
| 5,452,922 A | 9/1995 | Ziu | |
| 5,456,502 A * | 10/1995 | Sharp | F16L 39/005 285/123.1 |
| 5,590,690 A | 1/1997 | Ziu | |
| 6,086,114 A * | 7/2000 | Ziu | F16L 39/005 285/123.17 |
| 6,231,087 B1 | 5/2001 | Ziu | |
| 9,664,324 B2 | 5/2017 | Sixsmith et al. | |
| 11,378,214 B2 | 7/2022 | Wolf | |
| 2019/0049051 A1* | 2/2019 | Wu | F16L 39/005 |

OTHER PUBLICATIONS

Orion CFX2, "Double Containment Piping Systems", orion-cfx2_catalog.pdf, Nov. 12, 2015.

* cited by examiner

*Primary Examiner* — James M Hewitt, II
(74) *Attorney, Agent, or Firm* — Day Pitney LLP; George Chaclas; Anthony A. Kassas

(57) ABSTRACT

A dual containment pipe assembly includes an outer containment pipe defining a rib on an interior surface thereof. An inner containment pipe can be positioned inside of the outer containment pipe. The inner containment pipe has at least one clip on an exterior surface thereof. At least one spacer wheel is between the outer containment pipe and the inner containment pipe. The spacer wheel has an inner channel for engagement to the clip and an outer groove for engagement to the rib. The spacer wheel includes: an inner circumferential hub defining the inner channel for engaging the clip; an outer circumferential rim defining the outer groove for engaging the rib; and a plurality of support spokes connecting the inner circumferential hub and the outer circumferential rim.

12 Claims, 13 Drawing Sheets

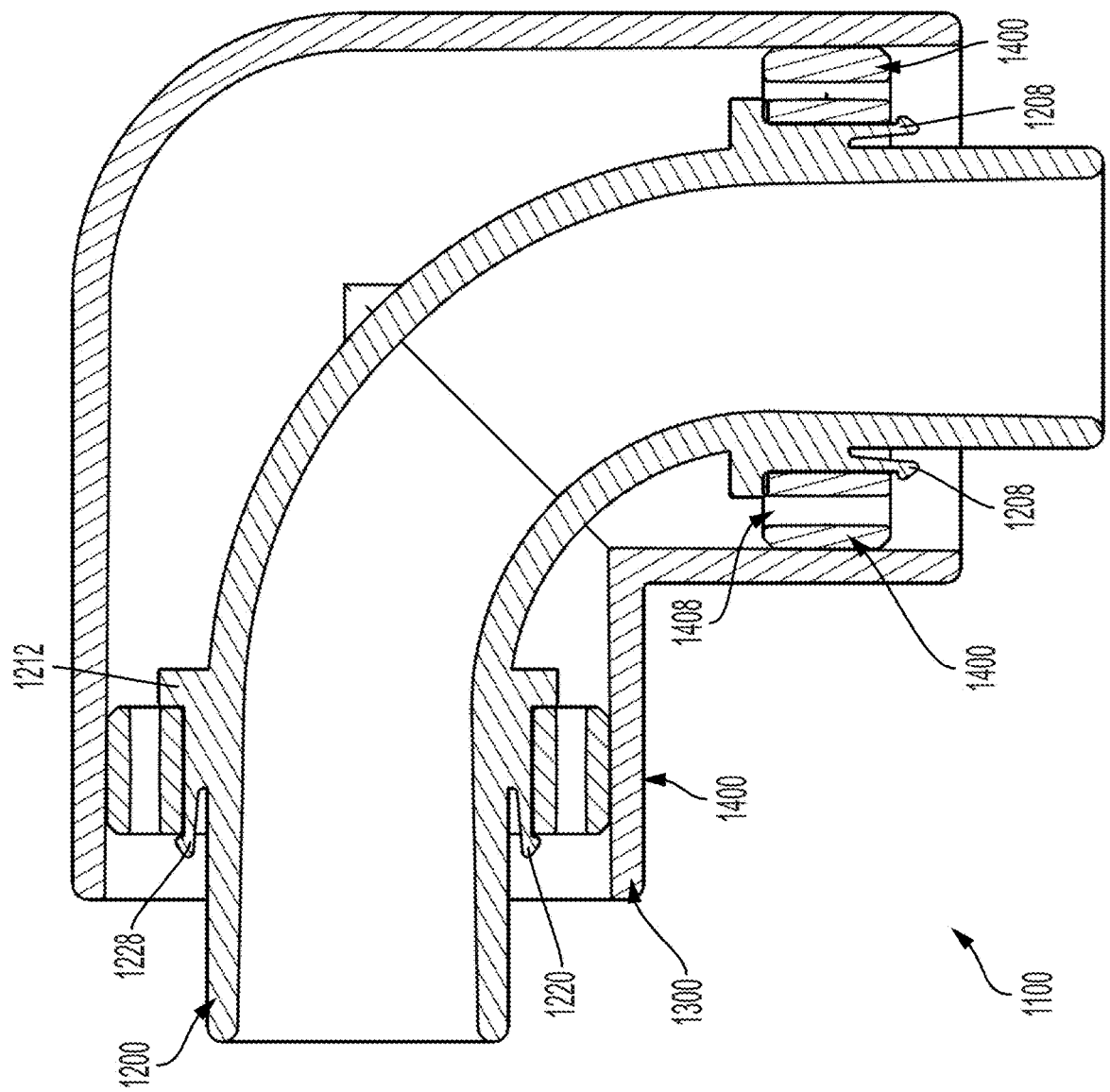

DUAL CONTAINMENT PIPE ASSEMBLY

FIELD OF THE DISCLOSURE

The subject disclosure relates to fluid transport systems, and more particularly to dual containment piping elbows.

BACKGROUND

In the domain of fluid transport systems, particularly those requiring changes in flow direction such as elbows, dual containment pipe configurations have garnered considerable attention for their ability to enhance safety and environmental protection. The related art has seen the emergence of various solutions to address the complexities associated with the design and manufacturing of dual containment pipe elbows, each attempting to strike a balance between adherence to industry standards, manufacturing efficiency, and structural integrity.

One prevalent approach within the related art involves the use of split inner containment for elbows, where the inner pipe is divided into two to four pieces that are subsequently welded together. This segmented inner containment design allows for flexibility in adapting to the curvature of the elbow. However, challenges arise in ensuring a seamless connection between the split pieces, and the integration of the geometry to secure the inner containment to the outer containment often adds complexity to the manufacturing process. Achieving a robust and leak-proof joint becomes critical in maintaining the effectiveness of the dual containment system.

An alternative solution explored in the related art is the implementation of zero-radius change in direction for the flow within the elbow. Zero-radius change essentially refers to a type of pipe fitting or bend that allows for a change in the direction of the pipe fitting or bend without introducing a curve or radius-essentially a sharp, abrupt turn without a gradual curve. This approach, while conducive to streamlined manufacturing processes, deviates from established industry standards, potentially compromising compatibility with existing systems. Maintaining adherence to standard specifications is crucial for ensuring compatibility, ease of integration, and interchangeability within diverse fluid transport infrastructures.

In the pursuit of optimizing manufacturing efficiency without sacrificing compliance with industry standards, a key consideration is the need to streamline the production of dual containment elbows. Ensuring a smooth and cost-effective manufacturing process is imperative for widespread adoption. Balancing the specified radius for the change in flow direction, as mandated by industry standards, with the imperative to simplify manufacturing processes poses a considerable challenge. The related art has seen efforts to innovate manufacturing techniques that allow for the efficient production of dual containment elbows while upholding the structural and functional requisites specified by industry standards.

SUMMARY

The related art has explored diverse solutions for dual containment pipe elbows, ranging from split inner containment configurations to zero-radius changes in direction. The ongoing challenge lies in harmonizing manufacturing efficiency with adherence to industry standards, ensuring that dual containment elbows maintain structural integrity while being conducive to streamlined and cost-effective production processes. The present disclosure aims to address these challenges by introducing novel approaches to the design and manufacturing of dual containment elbows, providing a robust solution that reconciles compliance with standards and manufacturing efficiency.

In one embodiment, the subject technology is directed to a dual containment pipe assembly including an outer containment pipe defining a rib on an interior surface thereof. An inner containment pipe can be positioned inside of the outer containment pipe. The inner containment pipe has at least one clip on an exterior surface thereof. At least one spacer wheel is between the outer containment pipe and the inner containment pipe. The spacer wheel has an inner channel for engagement to the clip and an outer groove for engagement to the rib. The spacer wheel includes an inner circumferential hub defining the inner channel for engaging the clip. The spacer wheel also includes an outer circumferential rim defining the outer groove for engaging the rib. A plurality of support spokes connect the inner circumferential hub and the outer circumferential rim. The plurality of support spokes, the inner circumferential hub and the outer circumferential rim define annular slots for allowing flow through the outer containment pipe.

The clip may include a base section with a deflectable finger configured for snap engagement with the inner channel of the spacer wheel. Preferably, the finger has a barb disposed at a distal end thereof the deflectable finger. The spacer wheel has an axial length corresponding to a distance between the banking surface and the barb. The outer containment pipe and inner containment pipe are elbow shaped with curves of any angle or even straight. Typically, a second spacer wheel is also disposed between the outer containment pipe and the inner containment pipe to also engage both containment pipes.

Another embodiment of the subject technology is directed to a dual containment pipe assembly including an outer containment pipe defining a flow axis. An inner containment pipe is positioned within the outer containment pipe. The inner containment pipe has a clip connected to an exterior surface thereof. A spacer wheel is disposed between the outer containment pipe and the inner containment pipe, the spacer wheel including an inner circumferential hub defining an inner channel. The inner channel is configured to snap engage the clip to set the spacer wheel at a predetermined axial location on the inner containment pipe. The spacer wheel may include an outer circumferential rim connected to the inner circumferential hub by a plurality of support spokes. The clip can include a base section with a banking surface, a deflectable finger extending from the base section, and a barb disposed at a distal end of the deflectable finger, opposite the base section. Preferably, the spacer wheel has an axial length corresponding to a distance between the base section and the barb.

Still another embodiment of the subject technology is directed to a dual containment pipe assembly including an outer containment pipe defining a rib on an interior surface thereof. An inner containment pipe is positioned within the outer containment pipe and a spacer wheel disposed between the outer containment pipe and the inner containment pipe. The spacer wheel includes an outer circumferential rim having a groove configured to slidingly engage the rib to orient the inner containment pipe within the outer containment pipe.

Preferably, the containment pipe assembly includes a second spacer wheel that is the same as the first spacer wheel. The inner containment pipe can include two pairs of diametrically opposed clips so that each spacer wheel snap fits into one of the pairs of clips. The outer containment pipe and inner containment pipe may be elbow shaped and the rib may only extend partially along a flow axis.

In another embodiment, a dual containment pipe assembly includes an outer containment pipe defining a first structure on an interior surface thereof and an inner containment pipe positioned inside of the outer containment pipe, the inner containment pipe having a second structure disposed on an exterior surface thereof. A spacer wheel is disposed between the outer containment pipe and the inner containment pipe, the spacer wheel defining an inner structure for engagement to the second structure, and an outer structure for engagement to the first structure. The first structure can be a rib, a groove and the like. The second structure can be a clip, a channel and the like. The inner structure can be a channel, a clip and the like. The outer structure can be a groove, a rib and the like.

BRIEF DESCRIPTION OF THE DRAWINGS

Various aspects of the present disclosure are discussed herein with reference to the accompanying Figures. It will be appreciated that for simplicity and clarity of illustration, elements shown in the drawings have not necessarily been drawn accurately or to scale. For example, the dimensions of some of the elements can be exaggerated relative to other elements for clarity or several physical components can be included in one functional block or element. Further, where considered appropriate, reference numerals can be repeated among the drawings to indicate corresponding or analogous elements. For purposes of clarity, however, not every component can be labeled in every drawing. The Figures are provided for the purposes of illustration and explanation and are not intended as a definition of the limits of the disclosure.

FIG. 13 is a cross-sectional view of the dual containment pipe assembly as referenced in FIG. 12, taken along line 13-13.

DETAILED DESCRIPTION

Figure 1:
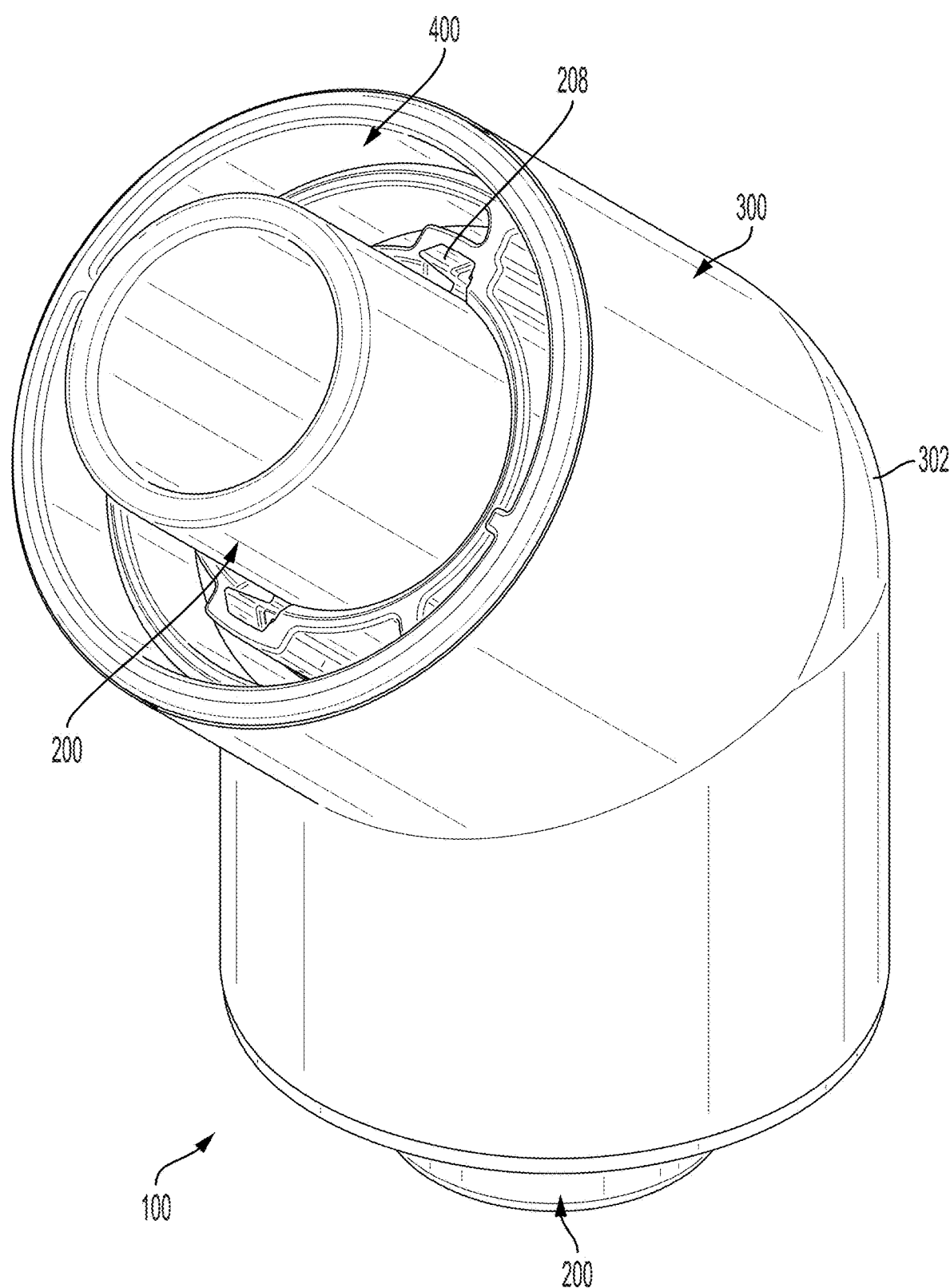
FIG. 1 is a perspective view of a first embodiment of a dual containment pipe assembly according to the subject disclosure.

The subject technology overcomes many of the prior art problems associated with fluid transport systems. The advantages, and other features of the technology disclosed herein, will become more readily apparent to those having ordinary skill in the art from the following detailed description of certain exemplary embodiments taken in combination with the drawings and wherein like reference numerals identify similar structural elements. It should be noted that directional indications such as vertical, horizontal, upward, downward, right, left and the like, are used with respect to the figures and not meant in a limiting manner.

Referring now to FIG. 1, a perspective view of a dual containment pipe assembly 100 is shown according to the subject disclosure. The dual containment pipe assembly 100 is particularly designed for fluid transports systems requiring enhanced safety and structural integrity. The assembly 100 includes an inner containment pipe 200 for conveying a primary fluid, an outer containment pipe 300 forming a secondary containment layer around the inner containment pipe 200, and two spacer wheels 400 (only one wheel visible in FIG. 1) disposed between the inner containment pipe 200 and the outer containment pipe 300 to hold and support the inner containment pipe 200 stable relative to the outer containment pipe 300. The dual containment pipe assembly 100 notably includes a change of flow direction, embodying a rough 45 degree elbow shape. The containment pipes 200, 300 and wheels 400 may be tubes formed of metal, polymer, composite materials, or other material, forming a circular cross section with curved cylindrical form. The inner containment pipe 200 serves as the primary conduit for transporting fluids.

Figure 2:
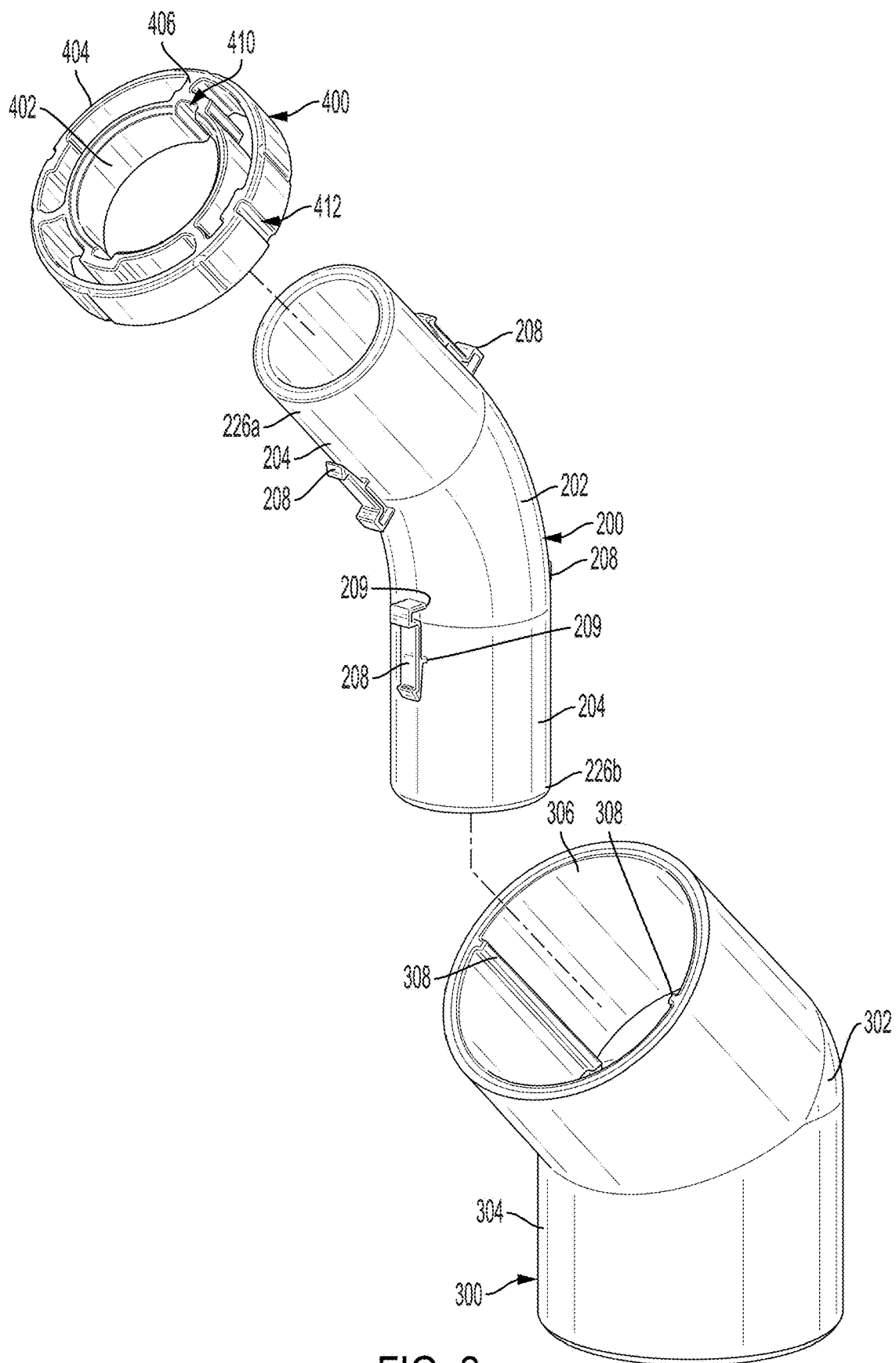
FIG. 2 is an exploded view of several components of the dual containment pipe assembly according to the subject disclosure, including an inner containment pipe, an outer containment pipe, and a single spacer wheel.
Figure 5:
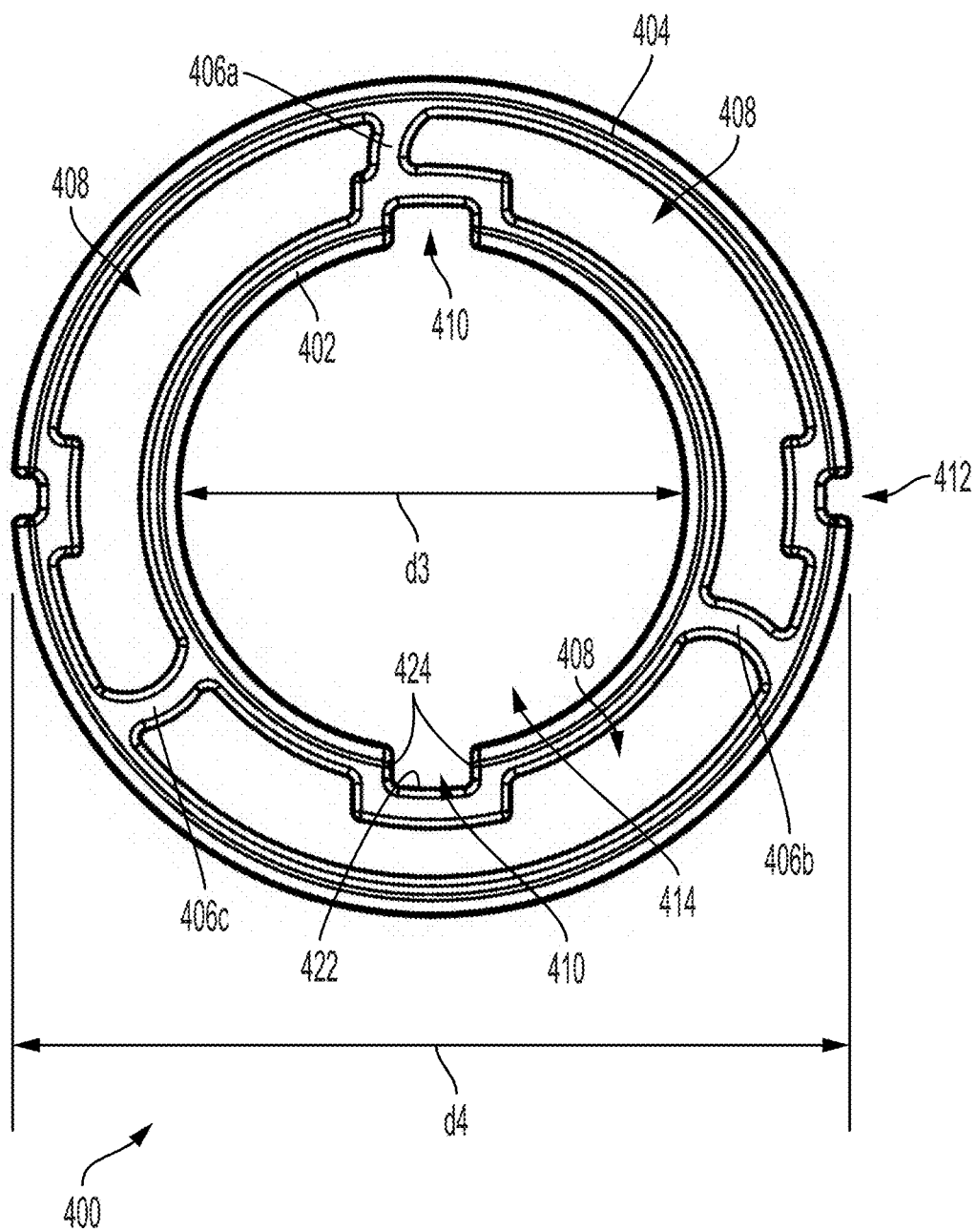
FIG. 5 is an isolated front plan view of the spacer wheel as referenced in FIG. 2.

FIG. 2 is an exploded view of the dual containment pipe assembly 100 according to the subject disclosure, including the inner containment pipe 200, the outer containment pipe 300, and the spacer wheels 400 (for simplicity, only one wheel 400 is shown in FIG. 2). Each of the inner and outer containment pipes 200, 300 has a curved portion 202, 302, as visible in the drawing, forming an elbow. Regardless of the shape, the inner containment pipe 200, in most embodiments, is substantially coextensive in silhouette with the outer containment pipe 300. The outer containment pipe 300 has an exterior surface 304 and an interior surface 306. The interior surface 306 defines a relatively tubular shape with a cross-sectional inner diameter d1 as shown in FIG. 5. The inner containment pipe 200 also has an exterior surface 204 and an interior surface 206. The interior surface 206 also defines a relatively tubular shape with a cross-sectional outer diameter d2 shown in FIG. 3.

The inner containment pipe diameter d2 is less than the outer containment pipe diameter d1. Thus, the inner containment pipe 200 is configured for disposing within the outer containment pipe 300 upon insertion. The spacer wheels 400 clock and clip the inner containment pipe relative to the outer containment pipe 300, which is explained in more detail below. In another embodiment, only a single spacer wheel is utilized.

Figure 3:
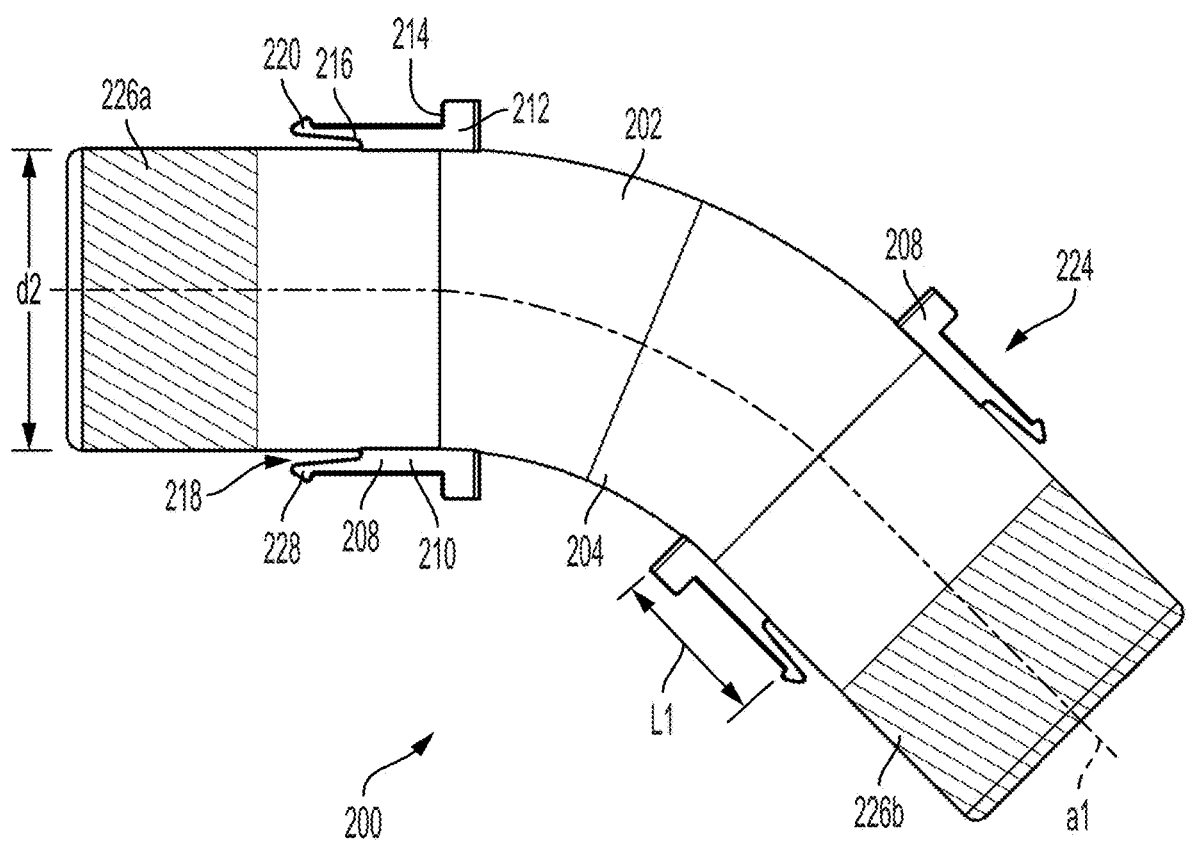
FIG. 3 is an isolated plan view of the inner containment pipe as referenced in FIG. 2, viewed from a side thereof.

Referring now to FIG. 3, an isolated plan view of the inner containment pipe 200 is shown and as referenced in FIG. 2, viewed from a side thereof. The inner containment pipe 200 can be designed with materials and dimensions suitable for the specific characters of the fluid to be conveyed, thus may be comprised of metals, polymers, or composite materials depending on the application requirements. The inner containment pipe 200 defines two opposing pairs of clips 208. Generally speaking, the clips 208 serve to secure, orient and support the inner containment pipe 200 within the outer containment pipe 300 in combination with the spacer wheel 400 as described in more detail below. It is recognized that the clips 208 shown in FIG. 2 are a slightly different version from the clips 208 of FIG. 3 and on. However, both clips 208 perform the same function if substantially the same way.

Referring to FIG. 3, each clip 208 extends from the exterior surface 204 of the inner containment pipe 200. Each clip 208 may be formed integral with the exterior surface 204, or, manufactured separately and connected thereto. Each clip 208 includes a base section 210. With respect to an axis a1 centrally located along the direction of fluid flow, each base section 210 has an axially inward block 212 that has a radially oriented bank surface 214.

Referring back to FIG. 2, the clips 208 have a base section that requires less material. The clips 208 include footings 209 for support and coupling to the exterior surface 204. The clips 208 may be formed separately and attached to the inner containment pipe 200 or integrally formed therewith.

Referring again to FIG. 3, the base section 210 of each clip 208 extends cohesively with the exterior surface 204 of the inner containment pipe 200, such as, in some cases, parallel to the exterior surface 204. The base section 210 terminates in an axially outward extending deflectable finger 216. In order for the finger 216 to in fact deflect, an alcove 218 is defined thereunder. The deflectable finger 216 terminates in a barb 220 with an angled banking surface 228 enabling the aforementioned clipping capability, specifically with the spacer wheel 400. The finger 216 has a radially oriented capture surface 222 that forms a channel 224. The channel 224 has an axial length 11. The inner containment pipe 200 terminate in ends 226a, 226b that are preferably fusible for fast connection into the fluid network. The ends 226a, 226b may also be threaded or otherwise suited to connect to a fluid network. As can be seen in FIG. 3, the inner containment pipe 200.

Figure 4:
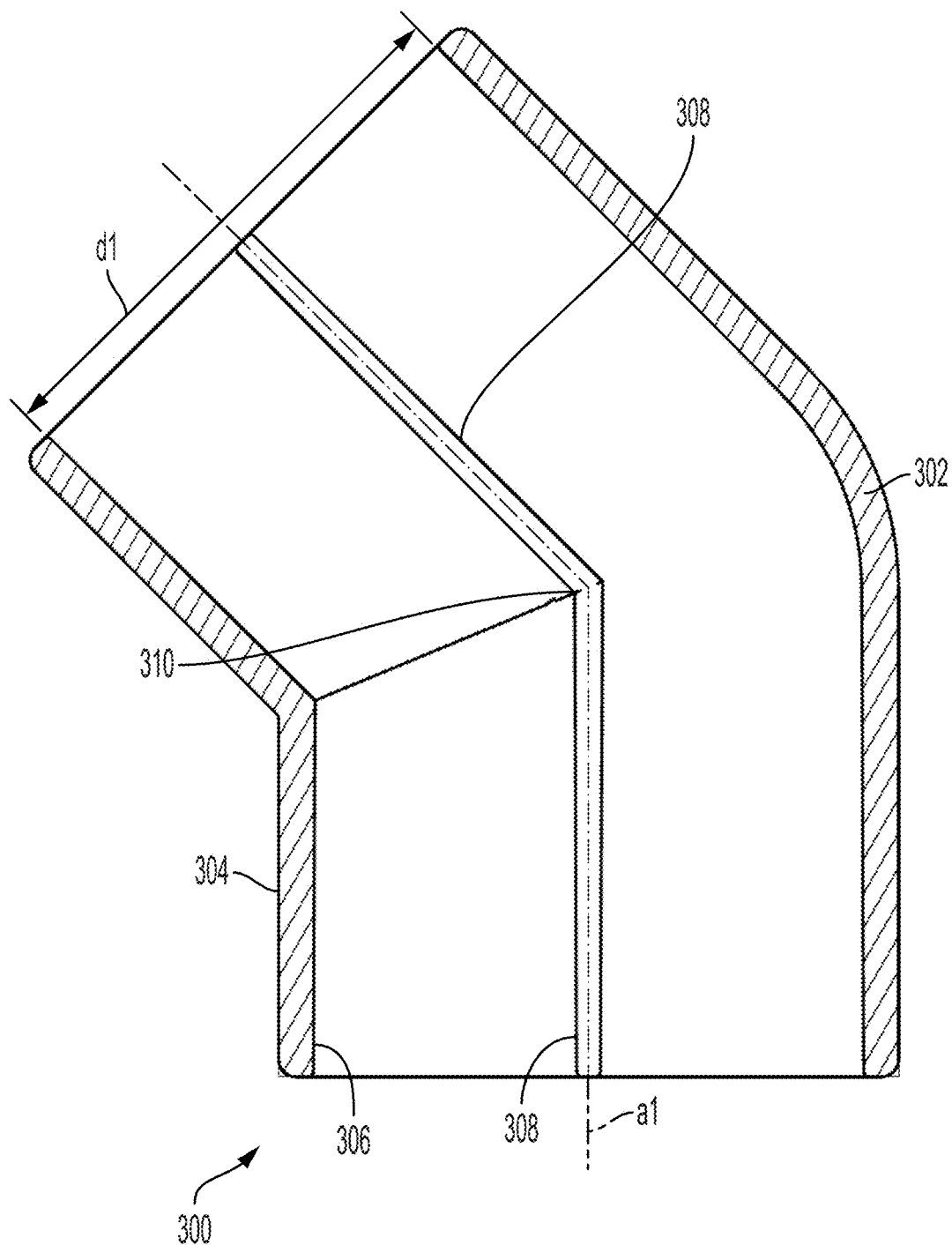
FIG. 4 is an isolated plan view of the outer containment pipe as referenced in FIG. 2, shown in cross section and particularly illustrating a rib running a length thereof.

Turning now to FIG. 4, an isolated plan view of the outer containment pipe 300 in cross section is shown. The outer containment pipe 300 particularly illustrates an inner rib 308 running a length thereof, generally centered with respect to the cross section of the outer containment pipe 300. Referring to FIG. 2 briefly, the interior surface 306 of the outer containment pipe 300 abruptly forms this rib 308 and a similar opposing rib 308. The ribs 308 are preferably substantially rectangular or square in cross-section. Each rib 308 runs the length of the interior surface 306 along flow axis a1, markedly changing direction only once at a rib inflection point 310. As mentioned prior, the rib 308 preferably remains centered with respect to the cross section of the outer containment pipe 300 throughout despite the curved section 302 of the outer containment pipe 300.

FIG. 5 is an isolated front plan view of the spacer wheel 400. The spacer wheel 400 includes an inner circumferential hub 402 and an outer circumferential rim 404 that basically form two concentric circles. The inner circumferential hub 402 forms a central opening 414 with a diameter d3 that approximates closely with the diameter d2 of the inner containment pipe 200. Likewise, the diameter d4 of the outer circumferential rim 404 approximates closely with the diameter d1 of the outer containment pipe 300.

The inner circumferential hub 402 and an outer circumferential rim 404 are connected by three separate spokes 406a-c. Each spoke 406a-c defines a slightly arched architecture to withstand greater compression forces and provide inherent stability in the spacer wheel 400. By nature of the inner circumferential hub 402 and an outer circumferential rim 404 being connected only by three separate spokes 406a-c, the spacer wheel 400 forms three annular slots 408 for which flow in the outer containment pipe 300 can ingress and egress.

It is noted that spoke 406a terminates in a channel 410 whereas spokes 406b, 406c feather into the inner hub 402. The spokes may be on any configuration and in any location. For example, there may only be two spokes, each spoke terminating in a channel. In another embodiment, there are four spokes equally spaced.

Further, the central opening 414 of the inner circumferential hub 402 defines two diametrically opposed inner channels 410. Each inner channel 410 is U-shaped with a bottom 422 and opposing sidewalls 424. By virtue of the U-shape, the inner hub 402 extends into the respective annular slot 408. The outer circumferential rim 404 embodies two diametrically opposed outer grooves 412. Each groove 412 is also U-shaped, and by virtue of this shape, also constricts the area of the respective annular slot 408 of the spacer wheel 400. The spacer wheel 400 has an axial length 12 (best seen in FIG. 7), that is substantially similar and essentially matches the clip axial length 11 (best seen in FIG. 3).

Referring back to FIG. 2, to assemble the dual containment pipe assembly 100, one of the ends 226a, 226b of the inner containment pipe 200 is coupled to one of the spacer wheels 400. For example, end 226a is inserted into central opening 414 of an inner circumferential hub 402 of a spacer wheel 400. The inner containment pipe 200 is aligned and rotated such that the clips 208 are aligned with the inner channels 410 for a snap fit. In effect, the clips 208 and inner channels 410 clock or determine the orientation of the wheel 400 with respect to the inner containment pipe 200. More specifically, the sidewalls 422 of the inner channels 410 rotationally hold the spacer wheels 400 in place about the clips 208. The clipping also positions the spacer wheel at a predetermined axial location on the inner containment pipe 200.

During interlock, the fingers 216 deflect radially inward by virtue of the angled banking surfaces 228 of the barbs 220 making frictional contact with the inner channels 410. When the barbs 220 pass through the inner channels 410, the barbs 220 are released from frictional contact, and the fingers 216 return to normal position. As a result, the spacer wheel 400 is also axially captured. That is, the wheel 400 is captured between the bank surface 214 and the barb 220 of each clip to limit axial travel for the spacer wheel 400. Thus, the spacer wheel 400 is clocked and axially clipped to the inner containment pipe 200 upon the aforementioned snap connection.

Once the spacer wheel 400 is clipped onto the inner containment pipe 200, the spacer wheel 400 can then be clocked and clipped into the outer containment pipe 300. That is, the other end 226b of the inner containment pipe is inserted into the outer containment pipe 300 so that the ribs 308 of the outer containment pipe 300 track in line with the outer grooves 412 of the spacer wheel 400. In effect, spacer wheel 400 and, thereby, the inner containment pipe 200 are keyed to the outer containment pipe 300. Once the inner containment pipe 200 is inserted into the outer containment pipe 300 to the desired depth, the end 226*a* may be connected to a fluid network by traditional means such as heat fusing and the like. Similarly, the outer containment pipe 300 may also be connected to the fluid network.

In any case, a second spacer wheel 400 may be inserted into the outer containment pipe 300 around the other end 226*b* of the inner containment pipe 200. The second spacer wheel 400 may be sized and configured to effectively lock the inner containment pipe 200 into an axial position within the outer containment pipe 300. To accomplish this insertion, the outer grooves 412 of the second spacer wheel 400 are aligned with the ribs 308 and, thus, the clips 208 are aligned with the inner channels 410 of the second spacer wheel 400. The second spacer wheel 400 is similarly inserted until the wheel 400 also snap fits into place. The other end 226*b* of the inner containment pipe 200 and the outer containment pipe 300 may then also be coupled to the fluid network.

The one or more spacer wheels and other components may be sized and shaped so that the connection of the spacer wheels sets an axial location of the inner containment pipe within the outer containment pipe. For example, the spacer wheel may be position on the inner containment pipe and have such an axial length that the spacer can be banked against the curved portion for repeatable, predetermined axial setting of the components. In another example, the two spacers may simply be sized to axially set the position of the inner containment pipe with respect to the outer containment pipe.

Figure 6:
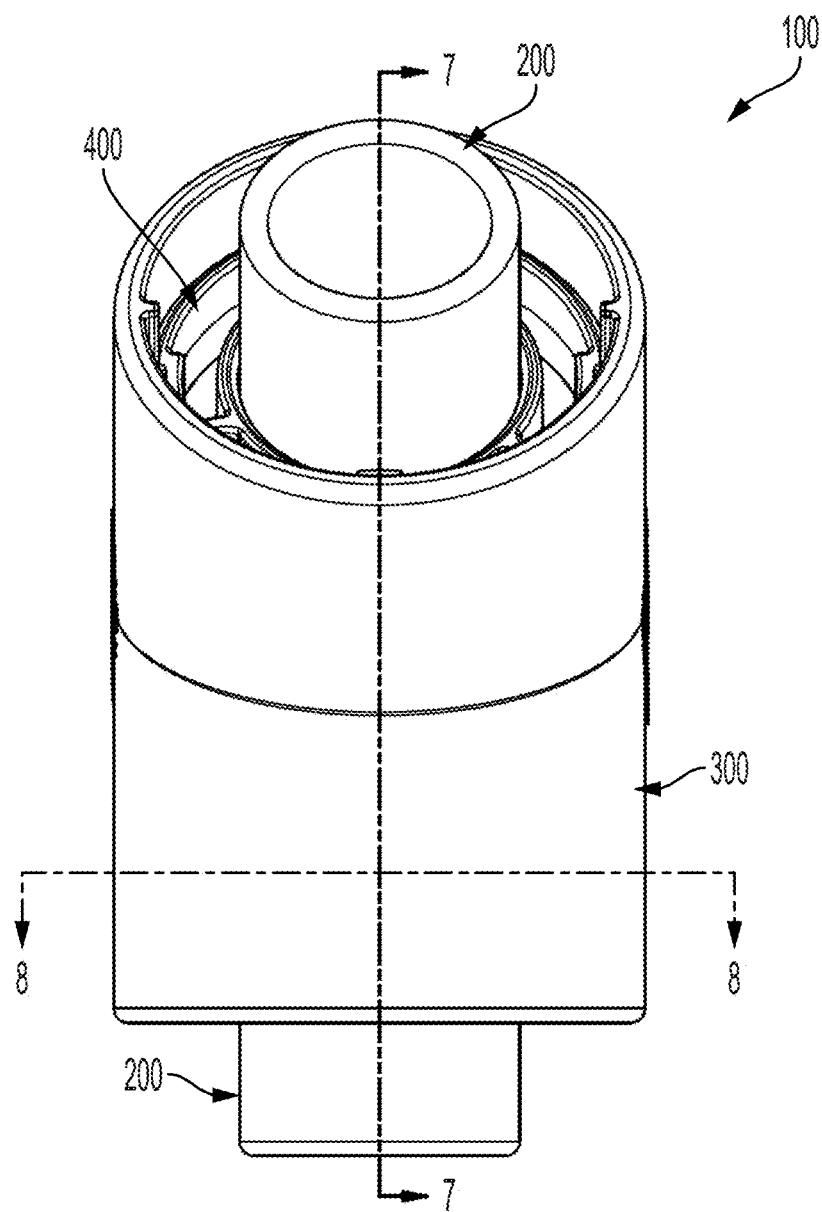
FIG. 6 is a second perspective view of the first embodiment of the dual containment pipe assembly, horizontally rotated roughly from 45 to 90 degrees relative to FIG. 1 and illustrating cross-section lines 7-7 and 8-8.
Figure 7:
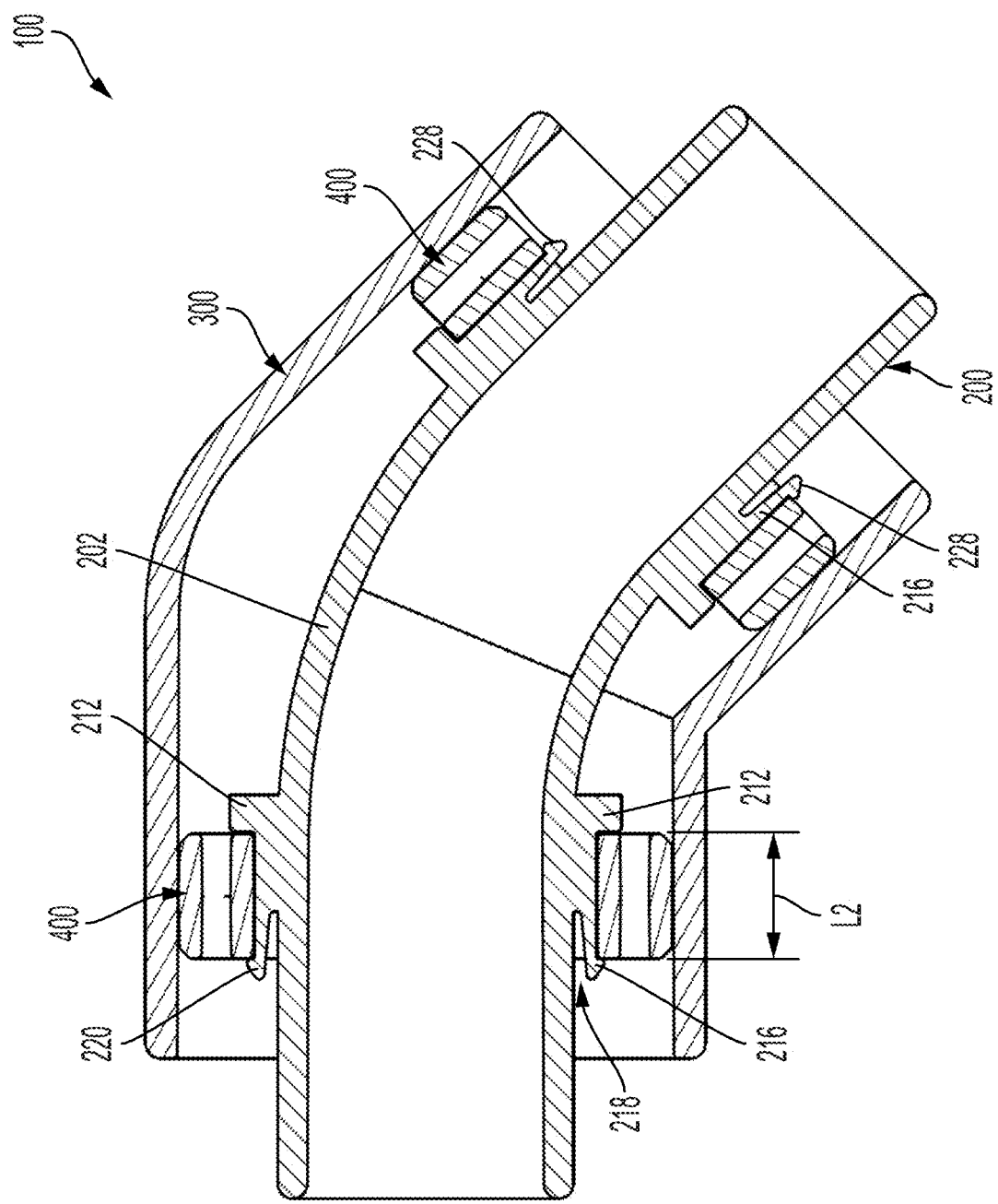
FIG. 7 is a cross-sectional view of the dual containment pipe assembly as referenced in FIG. 6, taken along line 7-7.
Figure 8:
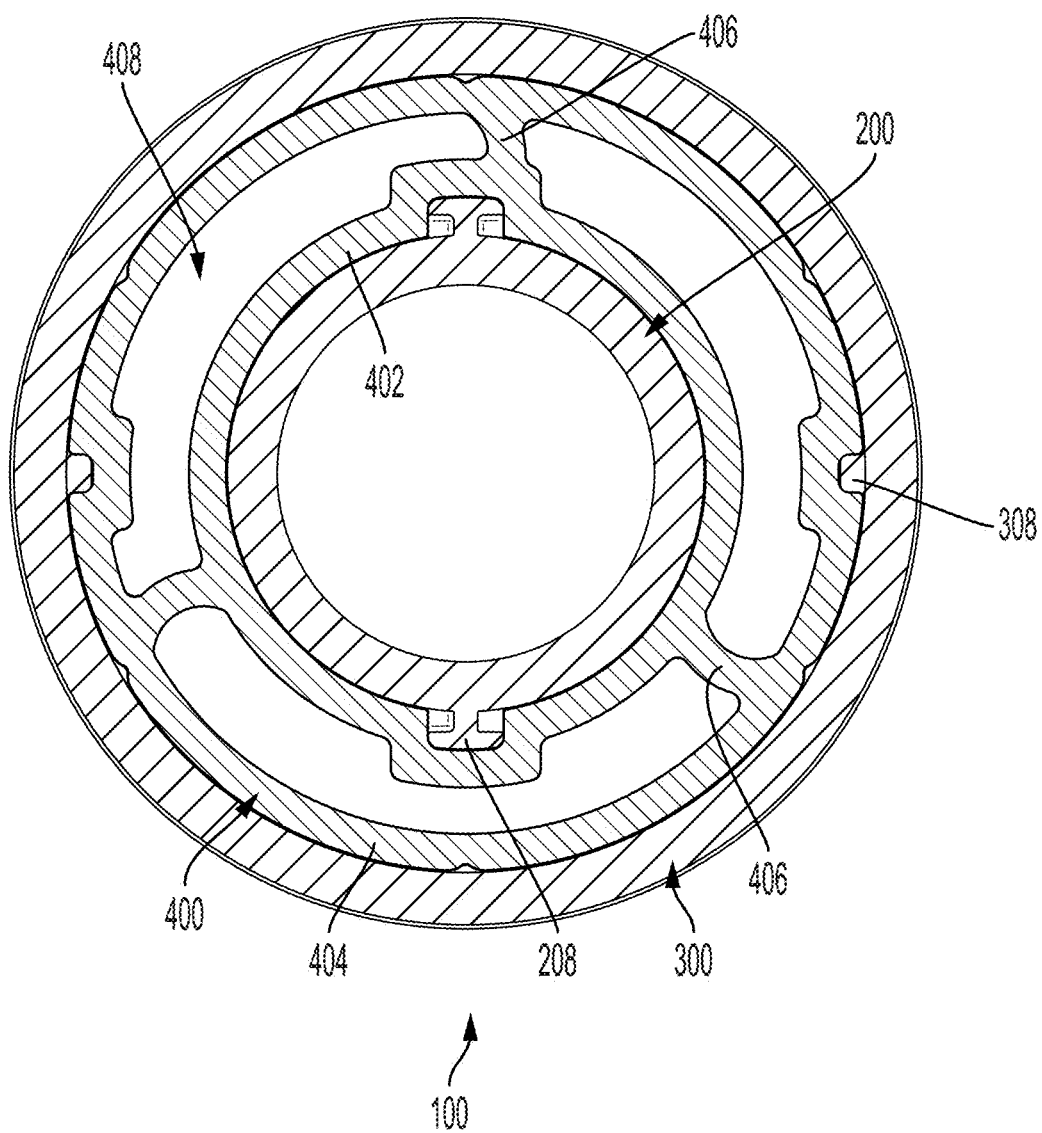
FIG. 8 is a cross-sectional view of the dual containment pipe assembly of FIG. 6 6, taken along line 8-8 to illustrate the connectivity between the inner containment pipe, outer containment pipe, and spacer wheel.

Referring now to FIGS. 6-8, the resulting assembled dual containment pipe assembly 100 is shown. FIG. 6 is a second perspective view of the dual containment pipe assembly 100, horizontally rotated roughly 45 degrees relative to FIG. 1. FIG. 6 includes cross-section line 7-7 and cross-section line 8-8 that correspond to the cross-sectional views in FIGS. 7 and 8, respectively. FIGS. 6-8 illustrate the connectivity between the inner containment pipe 200, outer containment pipe 300, and spacer wheel 400.

As can be seen, the subject technology minimizes the components required to create a double containment pipe elbow assembly while maintaining the radius for change of flow direction. Once assembled, the inner and outer containment pipes 200, 300 are oriented with respect to each other rotationally (e.g., clocked or keyed). Further, the two spacer wheels 400 not only effectively support the inner containment pipe 200 within the outer containment pipe 300 and allow flow if the inner containment pipe 200 leaks, but may also set an axial position of the inner containment pipe 200 within the outer containment pipe 300. Further if desired, the fingers 216 may be deflected using a flat blade screwdriver and/or the wheels 400 grabbed with needle nose pliers to disassemble the pipe assembly 100.

Figure 9:
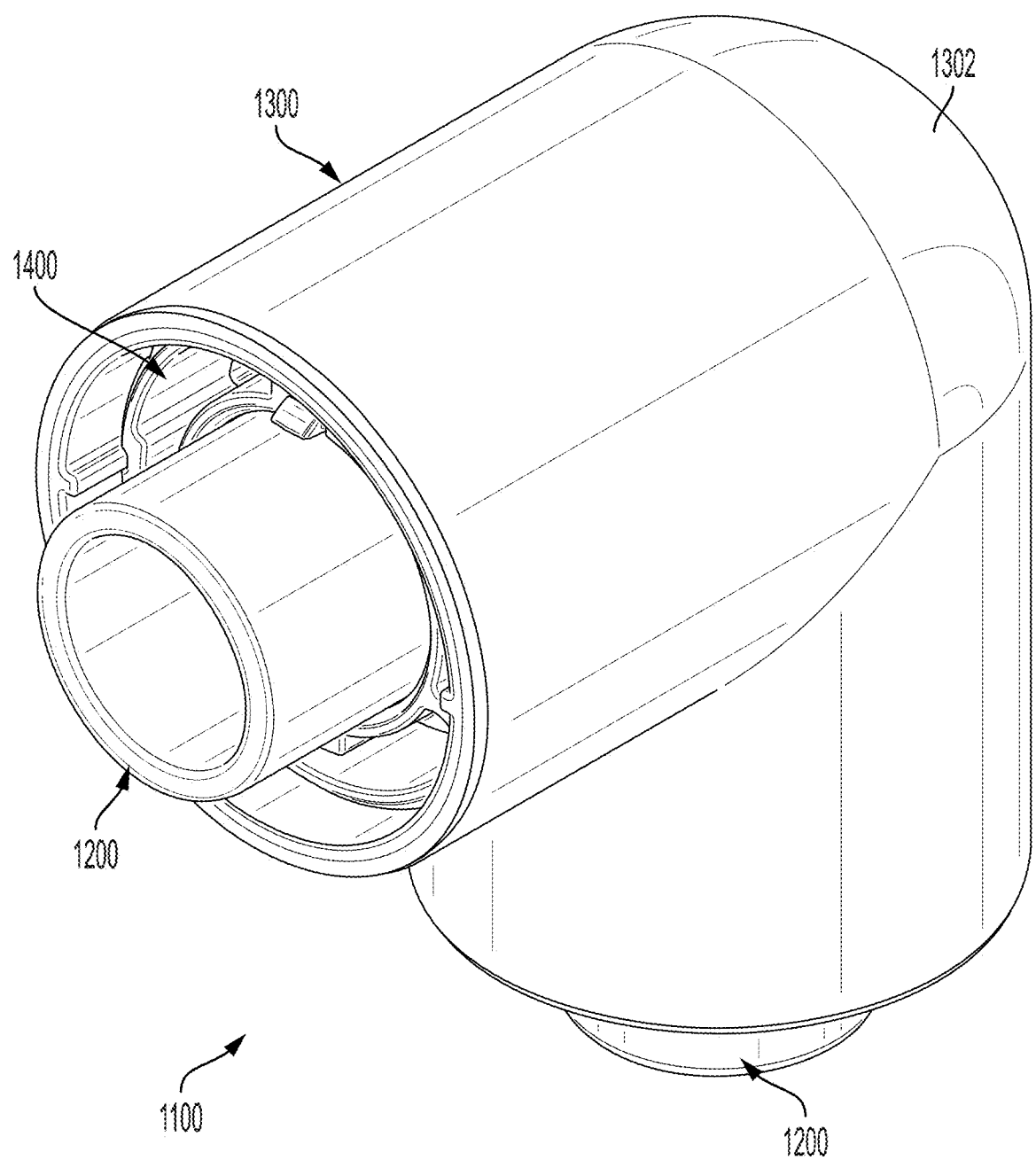
FIG. 9 is a perspective view of a second embodiment of the dual containment pipe assembly according to the subject disclosure.
Figure 10:
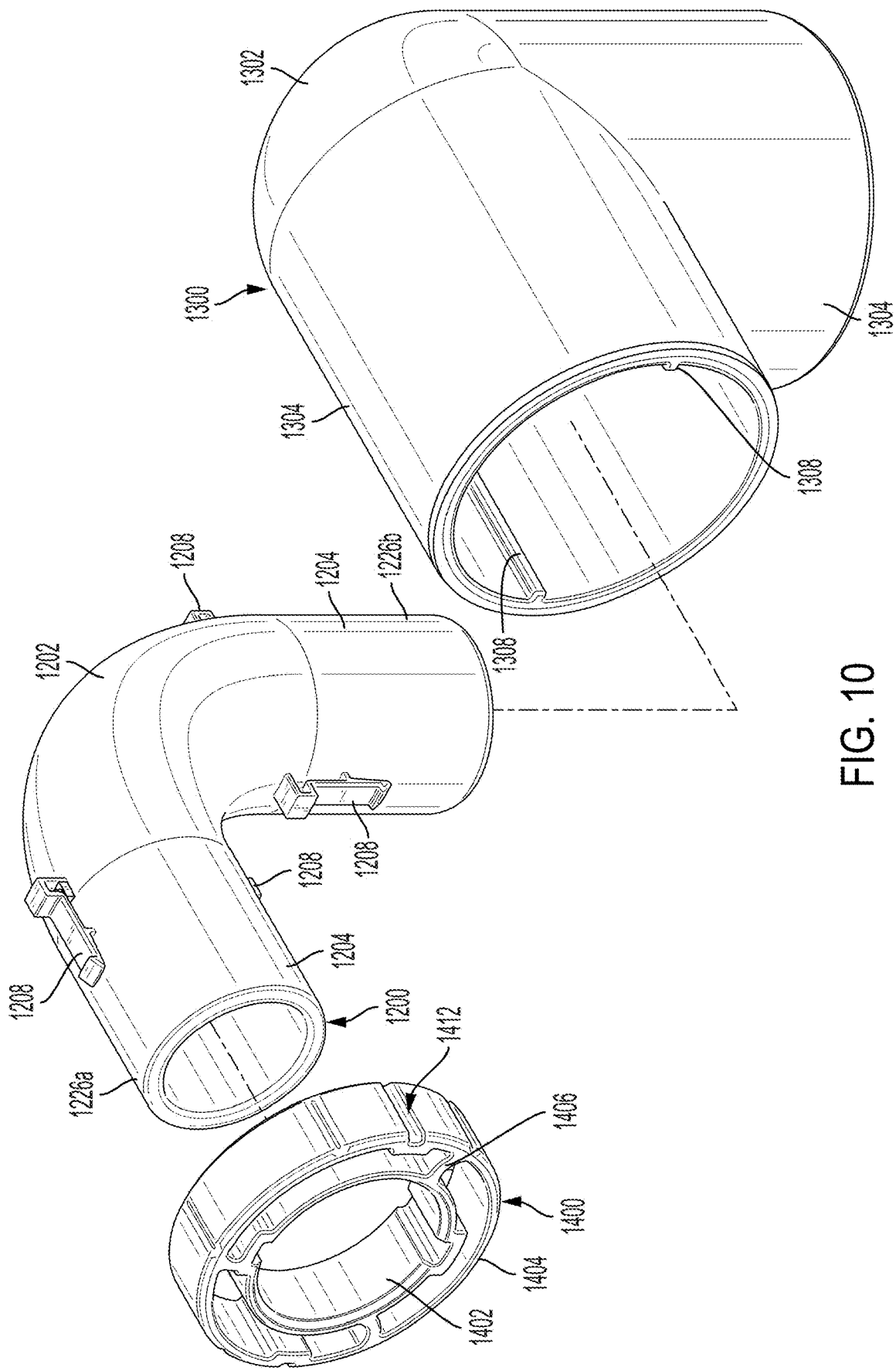
FIG. 10 is an exploded view of the dual containment pipe assembly as referenced in FIG. 9, including an inner containment pipe, an outer containment pipe, and only a single spacer wheel.
Figure 11:
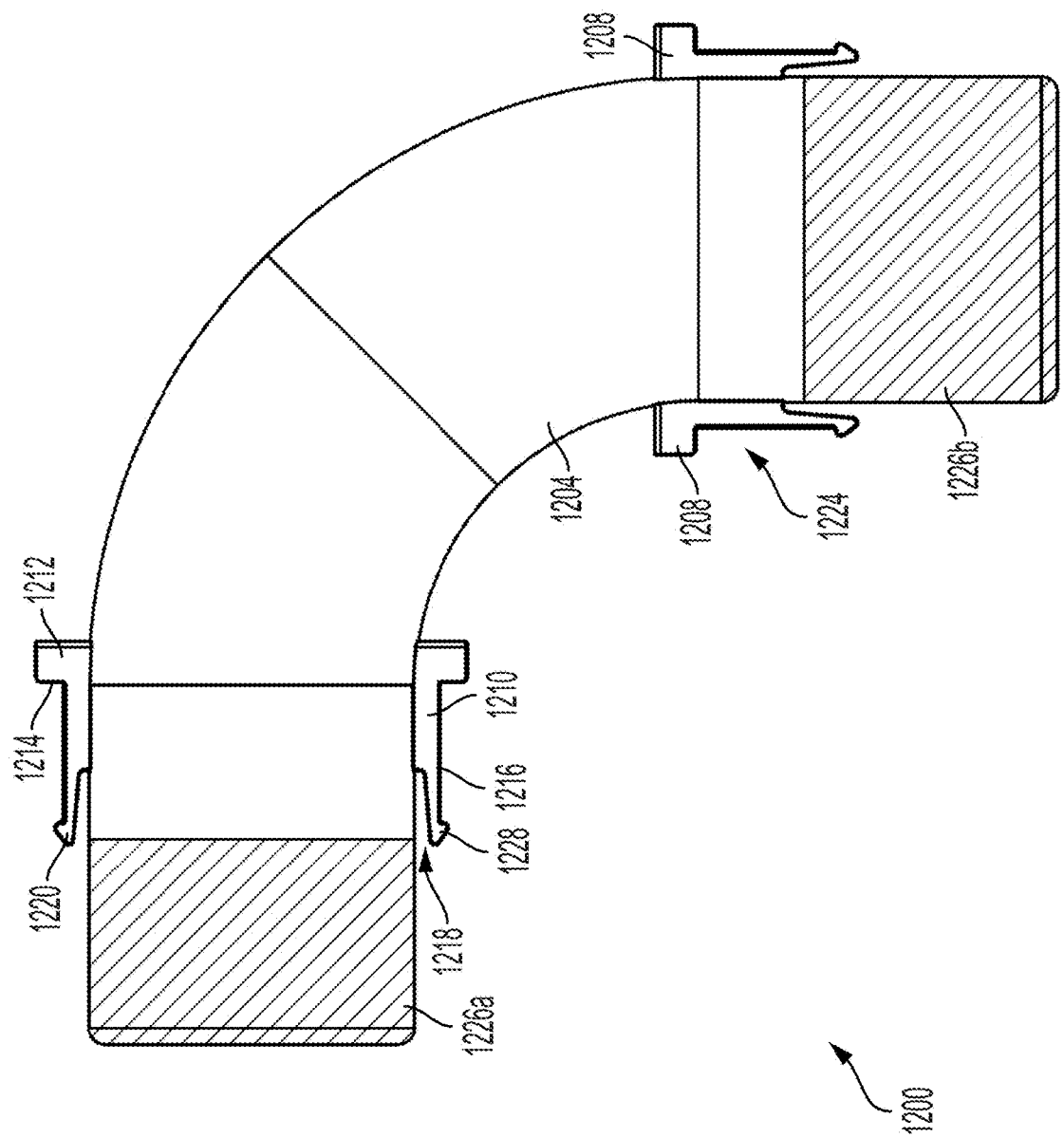
FIG. 11 is an isolated plan view of the inner containment pipe as referenced in FIG. 10, viewed from a side thereof.
Figure 12:
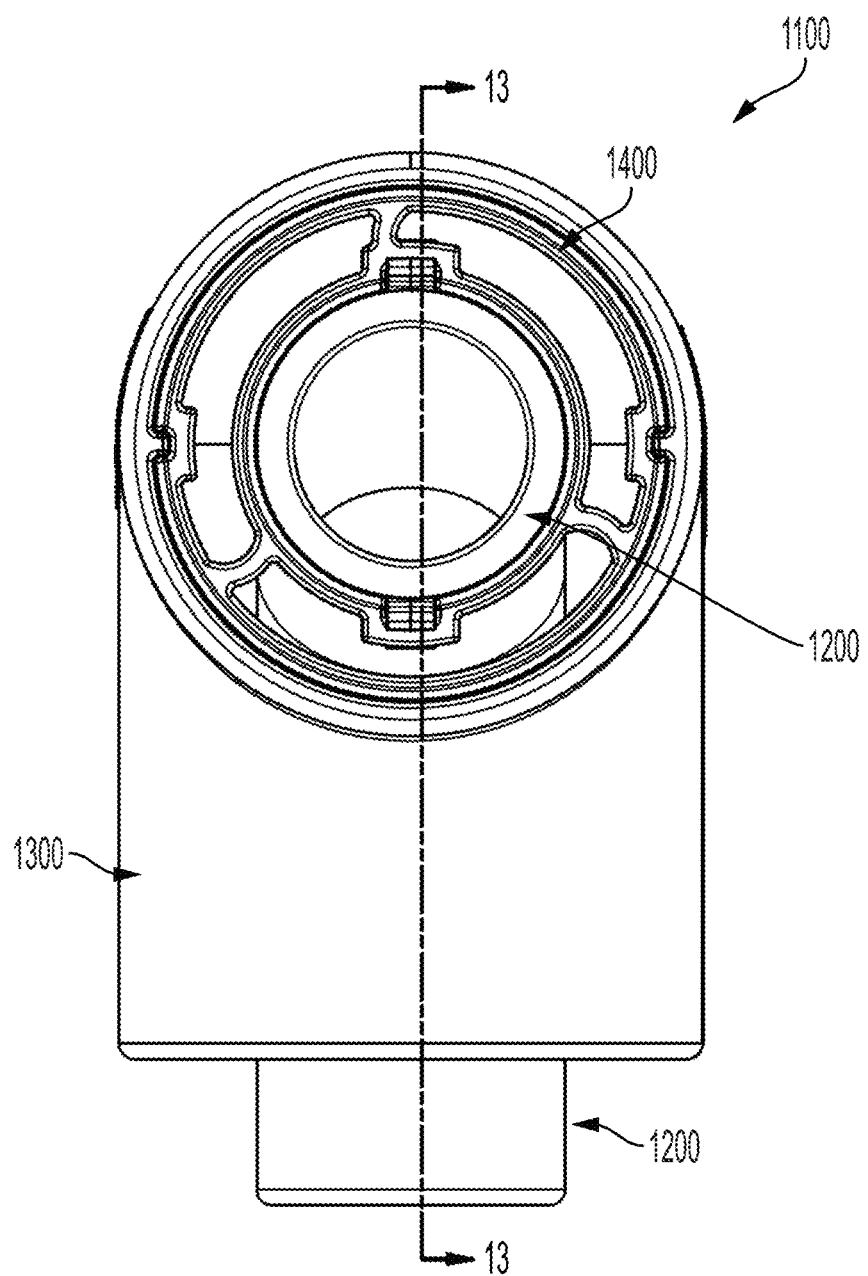
FIG. 12 is a second perspective view of the second embodiment of the dual containment pipe assembly, horizontally rotated roughly from 45 to 90 degrees relative to FIG. 9 with cross-section line 13-13.

Referring now to FIGS. 9-13, several views of a second embodiment of a dual containment pipe assembly 1100 according to the subject disclosure is shown. FIG. 9 is a perspective, assembled view. FIG. 10 is an exploded view of the dual containment pipe assembly 1100 as referenced in FIG. 9, including an inner containment pipe 1200, an outer containment pipe 1300, and a spacer wheel 1400. FIG. 11 is an isolated plan view of the inner containment pipe 1200 as referenced in FIG. 10, viewed from a side thereof. FIG. 12 is a second perspective view of the second embodiment of the dual containment pipe assembly 12100, horizontally rotated roughly 45 degrees relative to FIG. 9 and illustrating cross-section line 13-13. And lastly, FIG. 13 is a cross-sectional of the dual containment pipe assembly 1100.

The same principles as discussed with reference to the first embodiment of the dual containment pipe assembly 100 apply to the second embodiment of the dual containment pipe assembly 1100. Thus, similar components are identified with reference numerals in the thousands instead of the hundreds. The dual containment pipe assembly 1200 notably includes a zero change of radius change of flow direction, embodying a roughly 90 degree elbow shape. Any degree bend and straight is possible to utilize the subject technology. Though, the assembled interaction between the inner containment pipe 1200, an outer containment pipe 1300, and a spacer wheel 1400 remains the same. It is envisioned that the inner containment pipe 1200 is placed within the outer containment pipe 1300 without either wheel 1400 in place. Once positioned, the two wheels 1400 may be clipped on to the inner containment pipe 1200 to secure and fix the positional relationship between the pipes 1200, 1300.

In another embodiment, rather than clip to the inner containment pipe, one or more spacer wheels may be integrally formed or otherwise fixed to the inner containment pipe prior to assembly. In many instances, only a single spacer wheel would be required to accomplish a desirable pipe assembly utilizing the benefits of the subject disclosure. The rib may also only partially extend along the outer containment pipe. The rib may also terminate in a block that limits the insertion depth of the spacer wheel. To similarly limit and/or set an insertion depth of the spacer wheel, and in turn the inner containment pipe, the wheel may have an axial thickness along with the clip location set to butt up against the curve of the outer containment pipe. In still other embodiments, the pipe assembly may only include a single wheel or a single clip for each wheel. Also, the pipe assembly may have any angle of curve or even be straight while still utilizing the subject technology.

In another embodiment, the spacer wheel may also not have an inner hub. Instead, the spacer wheel could have one or a plurality of spokes that terminate in a channel to couple to corresponding clips on the inner containment pipe. Further, the channels may or may not have a sidewall that sets a rotational position of the spacer wheel when coupled to the clips.

Many other embodiments are also possible. For example without limitation, the clips could be on the outer pipe and the ribs formed on the inner pipe. As such, the channel would be formed on the outer rim of the spacer wheel and the groove formed on the inner hub. Alternatively, clips can be formed or attached as part of the spacer wheel. Correspondingly, channel features to couple with the clips can be formed on one or both pipes. Similarly, the grooves and ribs could also be mixed and matched on the spacer wheel.

As can be seen, the subject disclosure provides many improvements to fluid transport systems. It will be appreciated by those of ordinary skill in the pertinent art that the functions of several elements can, in alternative embodiments, be carried out by fewer elements, or a single element. Similarly, in some embodiments, any functional element can perform fewer, or different, operations than those described with respect to the illustrated embodiment. Also, functional elements (e.g., fingers, clips, wheels, grooves, channels, ribs and the like) shown as distinct for purposes of illustration can be incorporated within other functional elements in a particular embodiment. Further, functional elements (e.g., fingers, clips, wheels, grooves, channels, ribs and the like) can be rearranged, switched, and substituted for as well as used collectively and individually.

While the subject technology has been described with respect to various embodiments, those skilled in the art will readily appreciate that various changes and/or modifications can be made to the subject technology without departing from the scope of the present disclosure.

What is claimed is:

1. A dual containment pipe assembly comprising:
an outer containment pipe defining a first structure on an interior surface thereof;
an inner containment pipe positioned inside of the outer containment pipe, the inner containment pipe having a second structure disposed on an exterior surface thereof;
a spacer wheel disposed between the outer containment pipe and the inner containment pipe, the spacer wheel defining an inner structure for engagement to the second structure, and an outer structure for engagement to the first structure; and
wherein the first structure is a rib, the second structure is a clip, the inner structure is a channel, and the outer structure is a groove.

2. The dual containment pipe assembly of claim 1, wherein the spacer wheel includes: an inner circumferential hub defining the inner channel for engagement to the clip of the inner containment pipe; an outer circumferential rim defining the outer groove for engagement to the rib of the outer containment pipe; and a plurality of support spokes connecting the inner circumferential hub and the outer circumferential rim, wherein the plurality of support spokes, the inner circumferential hub and the outer circumferential rim define annular slots.

3. The dual containment pipe assembly of claim 1, wherein the clip includes: a deflectable finger configured for snap engagement with the inner channel of the spacer wheel; a base section with a banking surface from which the deflectable finger extends; and a barb disposed at a distal end of the deflectable finger, opposite the base section.

4. The dual containment pipe assembly of claim 3, wherein the spacer wheel has an axial length corresponding to a distance between the banking surface and the barb.

5. The dual containment pipe assembly of claim 1, wherein the outer containment pipe and inner containment pipe are elbow shaped.

6. The dual containment pipe assembly of claim 1, further comprising a second spacer wheel disposed between the outer containment pipe and the inner containment pipe, the second spacer wheel also configured for engagement with both containment pipes.

7. A dual containment pipe assembly comprising:
an outer containment pipe defining a flow axis;
an inner containment pipe positioned within the outer containment pipe, the inner containment pipe having a clip connected to an exterior surface thereof;
a spacer wheel disposed between the outer containment pipe and the inner containment pipe, the spacer wheel including an inner circumferential hub defining an inner channel,
wherein the inner channel is configured to snap engage the clip to set the spacer wheel at a predetermined axial location on the inner containment pipe; and
wherein the clip includes: a base section with a banking surface; a deflectable finger extending from the base section; and a barb disposed at a distal end of the deflectable finger, opposite the base section.

8. The dual containment pipe assembly of claim 7, wherein the spacer wheel includes an outer circumferential rim connected to the inner circumferential hub by a plurality of support spokes.

9. The dual containment pipe assembly of claim 7, wherein the spacer wheel has an axial length corresponding to a distance between the base section and the barb.

10. The dual containment pipe assembly of claim 7, wherein the outer containment pipe and inner containment pipe are elbow shaped.

11. A dual containment pipe assembly comprising:
an outer containment pipe defining a rib on an interior surface thereof;
an inner containment pipe positioned within the outer containment pipe;
a spacer wheel disposed between the outer containment pipe and the inner containment pipe, the spacer wheel includes an outer circumferential rim having a groove configured to slidingly engage the rib to fix the inner containment pipe within the outer containment pipe at a predetermined orientation; and
further comprising a second spacer wheel, wherein: the inner containment pipe includes two pairs of opposing clips; each spacer wheel defines an inner circumferential hub connected to the outer circumferential rim by a plurality of support spokes; and the outer circumferential wheel rim fits snugly in the outer containment pipe and each spacer wheel snap fits into one of the pairs of clips.

12. The dual containment pipe assembly of claim 11, wherein the outer containment pipe and inner containment pipe are elbow shaped and the rib extends at least partially along a flow axis.

* * * * *